US012327861B2

United States Patent
Xu et al.

(10) Patent No.: US 12,327,861 B2
(45) Date of Patent: Jun. 10, 2025

(54) X-RAY FLUORESCENCE (XRF) MAPPING FOR ANODE INSPECTION

(71) Applicant: GM GLOBAL TECHNOLOGY OPERATIONS LLC, Detroit, MI (US)

(72) Inventors: Shaomao Xu, Sterling Heights, MI (US); Michael P. Balogh, Novi, MI (US); Daad Bourhan Haddad, Warren, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 861 days.

(21) Appl. No.: 17/539,421

(22) Filed: Dec. 1, 2021

(65) Prior Publication Data

US 2023/0170529 A1 Jun. 1, 2023

(51) Int. Cl.
  *H01M 4/134* (2010.01)
  *G01N 23/223* (2006.01)
  *H01M 4/02* (2006.01)
  *H01M 4/38* (2006.01)
  *H01M 10/052* (2010.01)

(52) U.S. Cl.
  CPC .......... *H01M 4/134* (2013.01); *G01N 23/223* (2013.01); *H01M 4/382* (2013.01); *H01M 10/052* (2013.01); *H01M 2004/021* (2013.01); *H01M 2004/027* (2013.01)

(58) Field of Classification Search
  None
  See application file for complete search history.

(56) References Cited

U.S. PATENT DOCUMENTS

| 2008/0187835 A1* | 8/2008 | Takezawa | H01M 4/0421 118/712 |
| 2013/0220546 A1* | 8/2013 | Kim | H01M 4/0407 118/712 |
| 2017/0077553 A1* | 3/2017 | Hiraoka | H01M 10/0569 |
| 2023/0160821 A1* | 5/2023 | Herle | G01N 21/63 356/317 |

OTHER PUBLICATIONS

Orsilli, Jacopo et al. Angle Resolved-XRF analysis of Puebla ceramic decorations. Spectrochim. Acta, Part B. Oct. 2023, vol. 210, 106809 (Year: 2023).*

* cited by examiner

*Primary Examiner* — Robert S Carrico
(74) *Attorney, Agent, or Firm* — CANTOR COLBURN LLP (57) ABSTRACT

Aspects of the disclosure include leveraging an X-ray fluorescence (XRF) mapping of copper current collectors for non-contact, non-destructive, in-line quality inspections of thin lithium metal anodes. An exemplary method can include receiving an electrode at a detection surface of the XRF detector. The electrode can include the lithium anode on a surface of a current collector. X-rays are passed through the lithium anode and into the current collector and the intensity of characteristic radiation returning from the current collector is measured at the XRF detector. A lithium anode characteristic can be inferred based on the measured intensity of characteristic radiation from the current collector.

18 Claims, 5 Drawing Sheets

X-View

X-RAY FLUORESCENCE (XRF) MAPPING FOR ANODE INSPECTION

INTRODUCTION

The present disclosure relates to battery cell manufacturing, and particularly to an X-ray fluorescence (XRF) mapping of copper current collectors for non-contact in-line quality inspection of thin lithium metal anodes.

Electrodes are widely used in a range of devices that store electrical energy, including primary (non-rechargeable) battery cells, secondary (rechargeable) battery cells, fuel cells, and capacitors. An ideal electrode needs to balance various electrical energy storage characteristics, such as, for example, energy density, power density, maximum charging rate, internal leakage current, equivalent series resistance (ESR), charge-discharge cycle durability, high electrical conductivity, and low tortuosity.

Electrodes often incorporate current collectors to supplement or otherwise improve upon these electrical energy storage characteristics. Current collectors can be added to provide a higher specific conductance and can increase the available contact area to minimize the interfacial contact resistance between the electrode and its terminal. A current collector is typically a sheet of conductive material to which the active electrode material is attached. Copper current collectors are typically bonded via adhesion and/or calendering to relatively thin lithium anodes to form the basis of modern lithium metal-based batteries.

SUMMARY

Technical methods described herein leverage X-ray fluorescence (XRF) mappings of copper current collectors for non-contact in-line quality inspections of thin lithium metal anodes. In one exemplary embodiment, an electrode is received at a detection surface of an XRF detector. The electrode can include a lithium anode positioned on a surface of a current collector. X-rays are passed through the lithium anode and into the current collector and the intensity of characteristic radiation from the current collector is measured at the XRF detector. A lithium anode characteristic can be inferred based on the measured intensity of characteristic radiation from the current collector.

In some embodiments, the lithium anode characteristic includes one or more of lithium thickness, lithium thickness variation, a presence of a surface defect, and a presence of an internal defect. In some embodiments of the invention, determining the lithium anode characteristic includes correlating the measured intensity of characteristic radiation to a thickness of lithium. In some embodiments of the invention, the measured intensity of characteristic radiation is correlated to a thickness of lithium according to the formula $t=\ln(I_0/I)*\sin(\beta)*(\mu/\rho)^{-1}$, where t is the thickness of lithium, $I_0$ is a baseline intensity with no lithium coating, I is the measured intensity of characteristic radiation, $\beta$ is a detector angle, and $(\mu/\rho)$ is a mass absorption coefficient for lithium.

In another exemplary embodiment, the lithium anode includes a thin lithium anode having a thickness of less than 20 microns. In still other embodiments, the current collector includes a copper current collector and the characteristic radiation includes fluorescing L shell characteristic radiation.

In some embodiments of the invention, a second intensity of a second characteristic radiation is measured at the XRF detector. In some embodiments of the invention, a presence of a chemical impurity is characterized based on the measured second intensity of second characteristic radiation. In some embodiments of the invention, characterizing the lithium anode includes a non-contact, non-destructive, in-line process.

In yet another embodiment, continuous or near-continuous lithium anode characterization occurs by moving the lithium anode across the detection surface of the XRF detector. In some embodiments of the invention, a second XRF detector is positioned on an opposite surface of the lithium anode from the first XRF detector. In this manner, dual-sided anodes can be characterized. In some embodiments of the invention, a plurality of second XRF detectors are positioned on a same side of the lithium anode as the first XRF detector. In this manner, edge-to-edge thickness variability can be characterized.

Aspects of the disclosure include a method for characterizing lithium anode defects. An exemplary method includes creating a known defect in a lithium anode (sometimes referred to as a calibration anode). The known defect can include an internal void, a surface dent, or a surface bump in the lithium anode. A calibration electrode (previously characterized) including the lithium anode and a current collector is received at a detection surface of an XRF detector. X-rays are passed through the lithium anode and into the current collector and a local intensity of characteristic radiation from the current collector is measured at a region corresponding to the known defect. A correlation is determined between the measured local intensity of characteristic radiation and one or more parameters of the known defect. In some embodiments of the invention, the one or more parameters of the known defect include a shape, a depth, a location, or a size of the known defect.

In other embodiments, a second known defect is created in the lithium anode. The second known defect can be of a different type (e.g., depth, shape, size, etc.) than the known defect. A second local intensity of characteristic radiation from the current collector at a second region corresponding to the second known defect can be similarly measured and used to determine a correlation between the measured second local intensity of characteristic radiation and one or more parameters of the second known defect.

In some embodiments of the invention, an active electrode (i.e., one having unknown defects) is received at the detection surface of the XRF detector. X-rays through the lithium anode and into the current collector of the active electrode and an intensity of characteristic radiation from the current collector of the active electrode is measured. One or more previously unknown defects in the lithium anode can be characterized based on the measured intensity of characteristic radiation from the current collector in the active electrode and the determined correlation between the measured local intensity of characteristic radiation and one or more parameters of the known defect in the calibration electrode.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 2 illustrates an XRF-based characterization of defects in a lithium metal anode according to one or more embodiments;

DETAILED DESCRIPTION

The following description is merely exemplary in nature and is not intended to limit the present disclosure, its application or uses. It should be understood that throughout the drawings, corresponding reference numerals indicate like or corresponding parts and features.

Electrodes often incorporate current collectors to supplement or otherwise improve upon the electrical energy storage characteristics of the final integrated device (e.g., a battery). A current collector typically includes a sheet of conductive material (e.g., copper) to which an active electrode material (e.g., a metal anode layer) is attached. Current collector sheets are typically bonded via adhesion and/or calendering to an anode layer.

Lithium metal is widely considered to be a very promising anode material for next-generation batteries due to a number of attractive properties. For example, thin lithium anodes (less than about 20 μm) have the potential to provide a higher capacity and better energy densities than conventional anode materials. A 5 μm thick lithium anode layer provides 1 mAh/cm$^2$ capacity, which compares favorably to graphite-based anodes at a thickness of 20 μm for the same capacity. Notably, energy density (capacity per unit volume) drops as the thickness of the lithium anode increases.

Unfortunately, current battery fabrication processes cannot take full advantage of thin lithium anodes. Instead, conventional lithium-metal batteries rely on relatively thick lithium anodes (i.e., thicknesses greater than about 60 μm), while the characterization of thin lithium anodes (i.e., thicknesses under about 20 μm) is lacking. One challenge with thin lithium anode manufacturing is that current characterization techniques for thin lithium anodes rely on destructive sampling techniques which are slow (off-line) and expensive (reducing yield). Destructive sampling is used because non-destructive, on-line characterization techniques are not available for lithium due to its adsorption characteristics, which render lithium transparent to X-rays.

Nevertheless, efforts to develop battery fabrication processes that can effectively utilize thin lithium anodes are ongoing. Various cooperative bodies and standards have begun targeting new benchmarks for next-generation batteries that cannot be achieved using conventional materials (e.g., graphite and thick lithium). In particular, the European Council for Automotive R&D (EUCAR) standard claims that next-generation batteries should provide 1000 Wh/L capacity by 2030, which relies upon lithium metal anodes with thicknesses less than 20 μm.

One or more embodiments address one or more of the above-described shortcomings by leveraging X-ray fluorescence (XRF) mappings of current collectors for non-contact, non-destructive, in-line quality inspections of thin lithium metal anodes. Rather than attempting to analyze lithium directly, embodiments of the present invention characterize the underlying current collector using the absorption of characteristic radiation. For example, copper current collectors can be characterized using the absorption of the fluorescing L shell characteristic radiation. By analyzing the intensity of the copper characteristic L radiation from the current collector, a copper mapping can be generated that can be used to infer lithium loading (thickness), thickness variation, and the existence of internal or surface defects. Other current collector metals can be similarly used by measuring the respective characteristic radiation.

Technical solutions described herein facilitate a range of improvements to battery technology. As an initial matter, leveraging the absorption of the fluorescing L shell characteristic radiation from the copper current collector allows one to indirectly measure the lithium metal thickness variation as well as the lithium metal loading. Such methods are non-destructive, non-contact, and readily integrated within in-line fabrication schemes for lithium-based batteries. Additionally, since XRF is sensitive to most elements (carbon and heavier), many chemical impurities can be captured as well without needing to destructively sample the lithium. Lithium anodes manufactured according to one or more embodiments can be thinner than conventional lithium anodes without sacrificing highly scalable in-line processes. This can enable, for example, the efficient construction of next-generation, high-capacity lithium-ion batteries.

Figure 1:
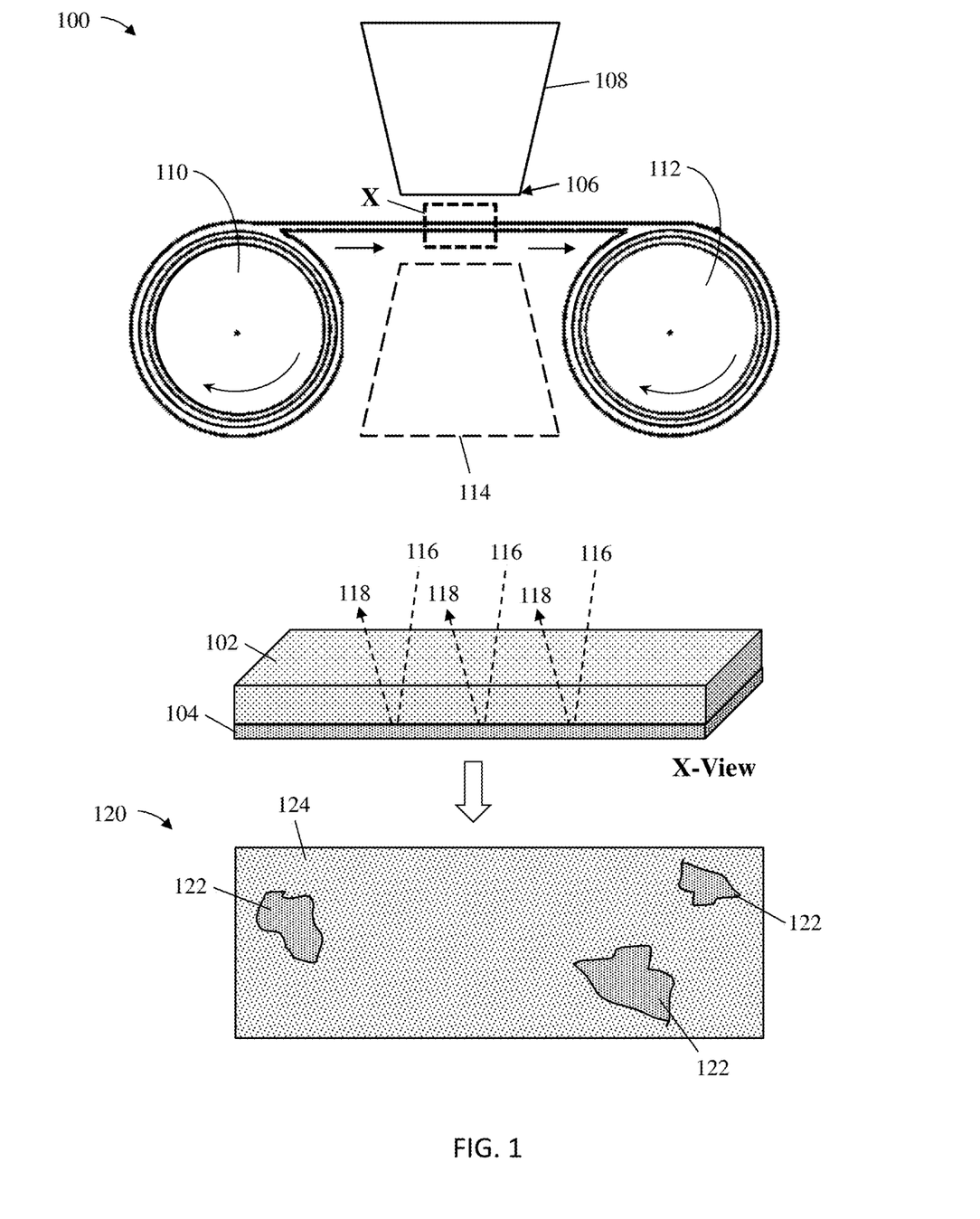
FIG. 1 illustrates an XRF-based characterization of a lithium metal anode according to one or more embodiments.

FIG. 1 illustrates an XRF-based characterization 100 of a lithium metal anode according to one or more embodiments. As shown in FIG. 1, a lithium metal anode 102 is formed over a current collector 104. The lithium metal anode 102 can be adhered or otherwise fixed to the current collector 104 using known processes, such as the use of an adhesion layer (not shown) and/or calendaring. In some embodiments of the invention, the current collector 104 is a copper current collector.

The lithium metal anode 102 and the current collector 104 are transported across a detection surface 106 of an XRF detector 108. In some embodiments of the invention, the lithium metal anode 102 and the current collector 104 are affixed to rollers (e.g., rollers 110 and 112) for in-line transportation to and across the XRF detector 108. While depicted in a specific configuration for in-line transportation for ease of illustration and discussion, the number and arrangement of rollers is not meant to be particularly limited. In addition, other in-line transportation techniques which do not rely on rollers can be similarly employed and are within the contemplated scope of the disclosure.

In some embodiments of the invention, a second XRF detector 114 is positioned on an opposite side of the lithium metal anode 102 and the current collector 104. In this configuration dual-sided anodes (not separately shown) can be characterized in the same manner as single sided anodes (as shown). In some embodiments of the invention, multiple XRF detectors are placed orthogonal (not shown) to the direction of motion of the lithium metal anode 102 and the current collector 104. This configuration can be used to check edge-to-edge thickness variability.

As shown in the detailed cross-sectional view X of FIG. 1, the XRF detector 108 (and XRF detector 114, if present) passes X-rays 116 through the lithium metal anode 102 and into the current collector 104. As discussed previously, pass-through is ensured due to lithium being transparent to X-rays. A portion of the X-rays 116 are absorbed into the surface of the current collector 104 and fluoresce as characteristic L radiation 118 (in the case of a copper current collector, as copper characteristic L radiation). The intensity of the returning characteristic L radiation 118 from the current collector 104 is then captured by the XRF detectors 108/114. Note that the current collector 104 is not limited to copper, for alternative materials such as Ni and stainless steel (Fe, Cr and/or Ni) the respective L radiation can be leveraged similarly.

In some embodiments of the invention, the intensity of the returning characteristic L radiation 118 from various regions of the current collector 104 is analyzed to generate a copper mapping 120. The copper mapping 120 will include regions of relatively higher intensity (e.g., regions 122) as well as regions of relatively lower intensity (e.g., regions 124). While depicted as having only two intensity gradations for ease of illustration and discussion, the number and relative difference between intensity gradations is not meant to be particularly limited. In some embodiments of the invention, characteristic L radiation intensity is measured across an arbitrarily large number of gradations to provide arbitrarily smooth transitions from higher intensity regions to lower intensity regions (and vice versa).

In some embodiments of the invention, the copper mapping 120 is leveraged to infer the loading and thickness variation of the lithium metal anode 102. In some embodiments of the invention, the returning characteristic L radiation 118 from a local region "R1" (defined, e.g., using top-down coordinates or any preferred system having a fixed origin) of the current collector 104 is correlated to the thickness of the lithium metal anode 102 at "R1" (i.e., directly above the same region of the underlying current collector 104) according to the formula (1):

$$t = \ln(I_0/I) * \sin(\beta) * (\mu/\rho)^{-1} \quad (1)$$

where "t" is the lithium metal thickness, "$I_0$" is the baseline copper L intensity with no coating (no lithium, experimentally predetermined), "I" is the observed copper L intensity, "$\beta$" is the detector angle, and "$(\mu/\rho)$" is the mass absorption coefficient for lithium.

Observe from formula (1) that $I_0$, $\beta$, and $(\mu/\rho)$ are fixed for a given application. Consequently, measured copper L intensities ("I") in the copper mapping 120 can be used to characterize lithium thickness ("t") across the surface of the lithium metal anode 102. Observe further that higher copper intensities will correspond to thinner lithium measurements and lower copper intensities will correspond to thicker lithium measurements, as "I" is a devisor in the previously described formula.

Advantageously, once the thickness distribution of lithium is determined from the copper mapping 120, variations in thickness across the surface of the lithium can be trivially determined. Moreover, characterizing lithium thickness and variation need not be done in a batch-like fashion. Instead, continuous or near-continuous lithium characterization can be accomplished by moving the lithium metal anode 102 across the detection surface 106 of the XRF detector 108 (and XRF detector 114, if present).

Figure 2A:
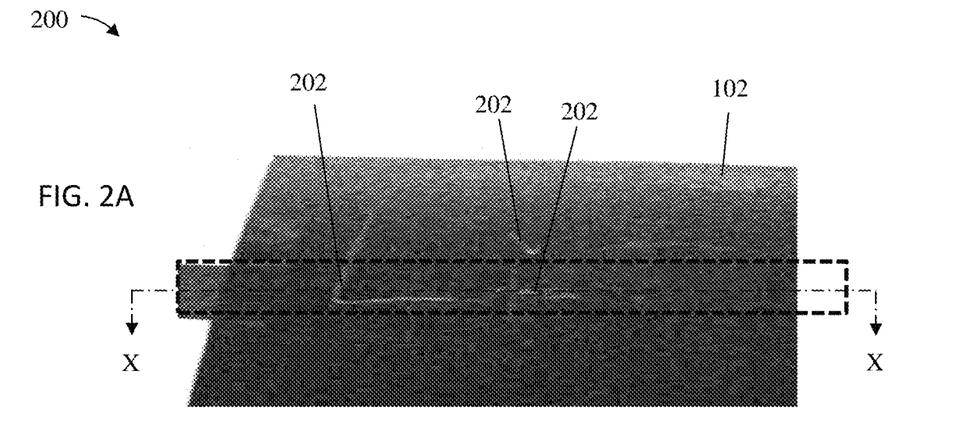
FIG. 2A illustrates a lithium metal anode having one or more defects.
Figure 2B:
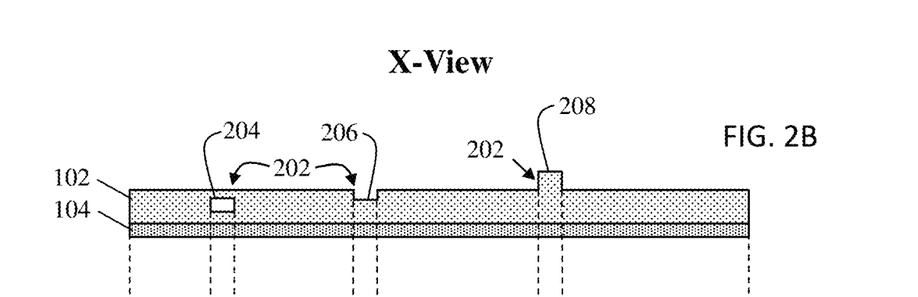
FIG. 2B illustrates a cross-sectional view of internal voids, surface dents, and surface bumps of the lithium metal anode shown in FIG. 2A.
Figure 2C:
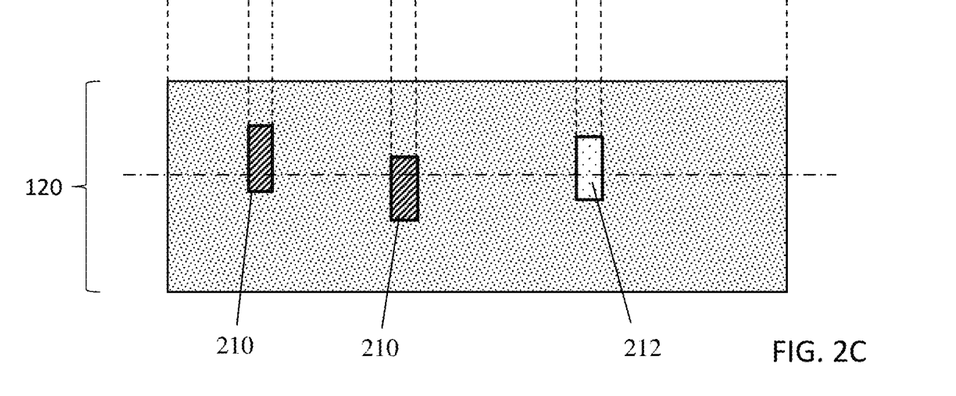
FIG. 2C illustrates the returning characteristic L radiation intensity of the internal voids, surface dents, and surface bumps shown in FIG. 2B.

FIGS. 2A, 2B, and 2C illustrate an XRF-based characterization 200 of defects in a lithium metal anode 102 according to one or more embodiments. As shown in FIG. 2A, the lithium metal anode 102 includes one or more defects 202. As further shown in the cross-sectional view X of FIG. 2B ("X-View"), the defects 202 include internal voids 204, surface dents 206, and surface bumps 208, although other defects are within the contemplated scope of the invention. In some embodiments of the invention, the defects 202 are inadvertently created during upstream battery manufacturing processes. Alternatively, or in addition, one or more of the defects 202 can be introduced intentionally for testing and/or calibration of the XRF-based characterization 200.

The lithium metal anode 102 and an underlying current collector 104 can be passed across a detection surface of one or more XRF detectors (not separately shown) according to one or more embodiments. In some embodiments of the invention, the XRF detectors pass X-rays through the lithium metal anode 102 and into the current collector 104. As discussed previously, returning characteristic L radiation intensity can be measured and used as the basis for generating a copper mapping 120.

As shown in FIG. 2C, the internal voids 204 and the surface dents 206 result in relatively high local intensities 210 as there is less lithium between the detector and the current collector 104. Conversely, the surface bumps 208 result in relatively low local intensities 212 as there is more lithium between the detector and the current collector 104. In some embodiments of the invention, various defects 202 having a variety of characteristics (depth, location, size, etc.) are intentionally created in the lithium metal anode 102 so that the resultant local intensities corresponding to those regions can be measured and stored in a reference database (not shown). In this manner, the relative strength (or weakness) of the returning characteristic L radiation can be used to infer the characteristics (depth, location, size, etc.) of true (inadvertent) lithium defects in later processes (such as described with respect to FIG. 1).

Figure 3:
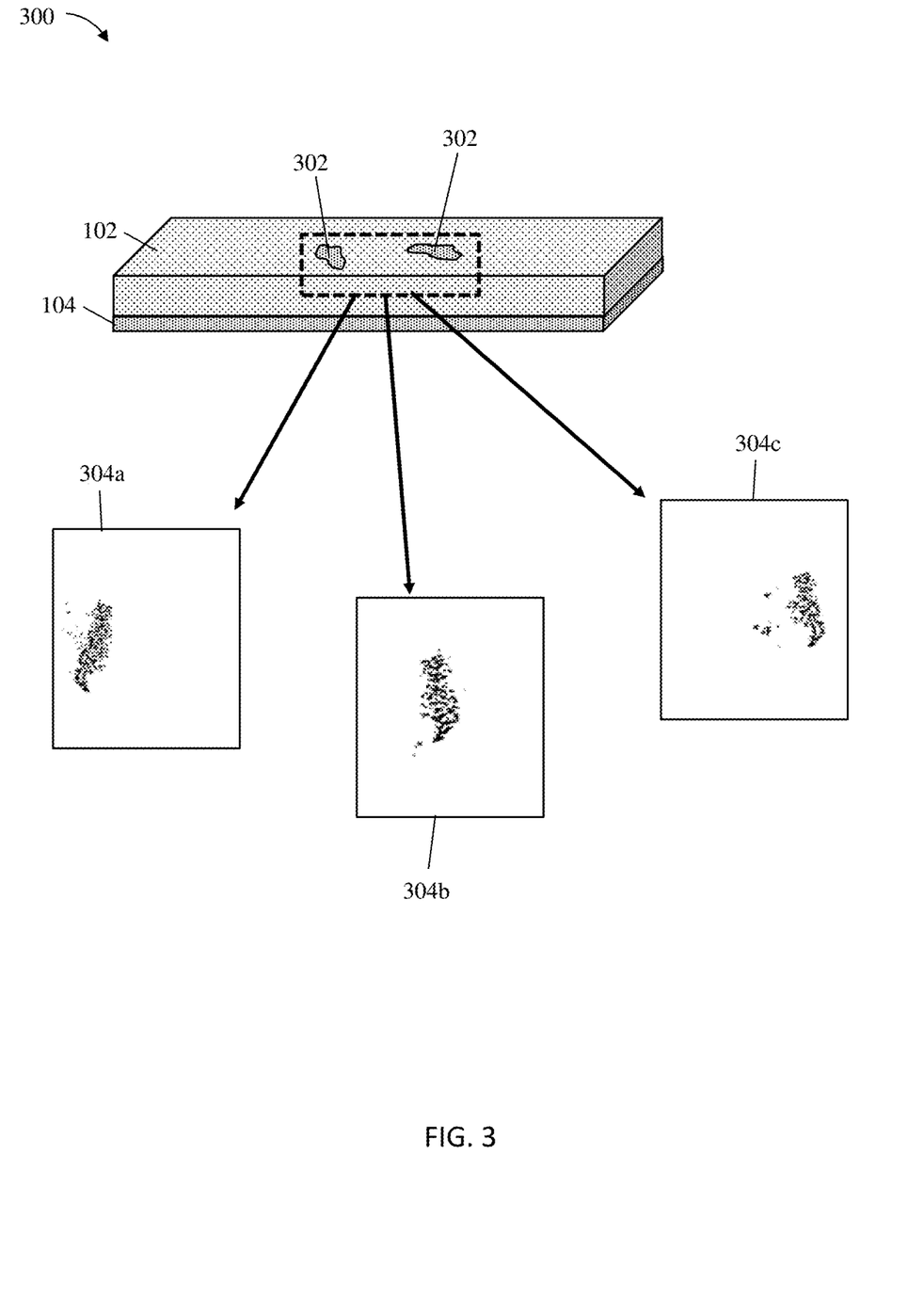
FIG. 3 illustrates an XRF-based characterization of chemical impurities in a lithium metal anode according to one or more embodiments.

FIG. 3 illustrates an XRF-based characterization 300 of chemical impurities in a lithium metal anode 102 according to one or more embodiments. As shown in FIG. 3, the lithium metal anode 102 includes one or more chemical impurities 302. In some embodiments of the invention, the chemical impurities 302 include various heavy elements (e.g., nickel, manganese, cobalt, etc.), although other impurities are within the contemplated scope of the invention. As used herein, a "heavy" element refers any element carbon or heavier.

Advantageously, XRF-based mappings generated according to one or more embodiments are sensitive to heavy elements, making these techniques useful for detecting chemical impurities. In some embodiments of the invention, returning characteristic radiation for one or more elements in the chemical impurities 302 are detected and used to form element-specific chemical impurities mappings (e.g., the mappings 304a, 304b, and 304c depicted in FIG. 3, corresponding to nickel, manganese, and cobalt, respectively).

In some embodiments of the invention, the chemical impurities 302 are inadvertently created or introduced during upstream battery manufacturing processes. For example, impurity dusts can be introduced during anode creation. Alternatively, or in addition, the chemical impurities 302 can be introduced intentionally for testing and/or calibration of the XRF-based characterization 300.

The lithium metal anode 102 and an underlying current collector 104 can be passed across a detection surface of one or more XRF detectors (not separately shown) according to one or more embodiments. In some embodiments of the invention, the XRF detectors pass X-rays through the lithium metal anode 102 and into the current collector 104. Various chemical impurities mappings can be generated in a similar manner as discussed previously with respect to FIG.

1 (i.e., returning characteristic radiation intensity can be measured and used as the basis for generating future mappings).

Figure 4:
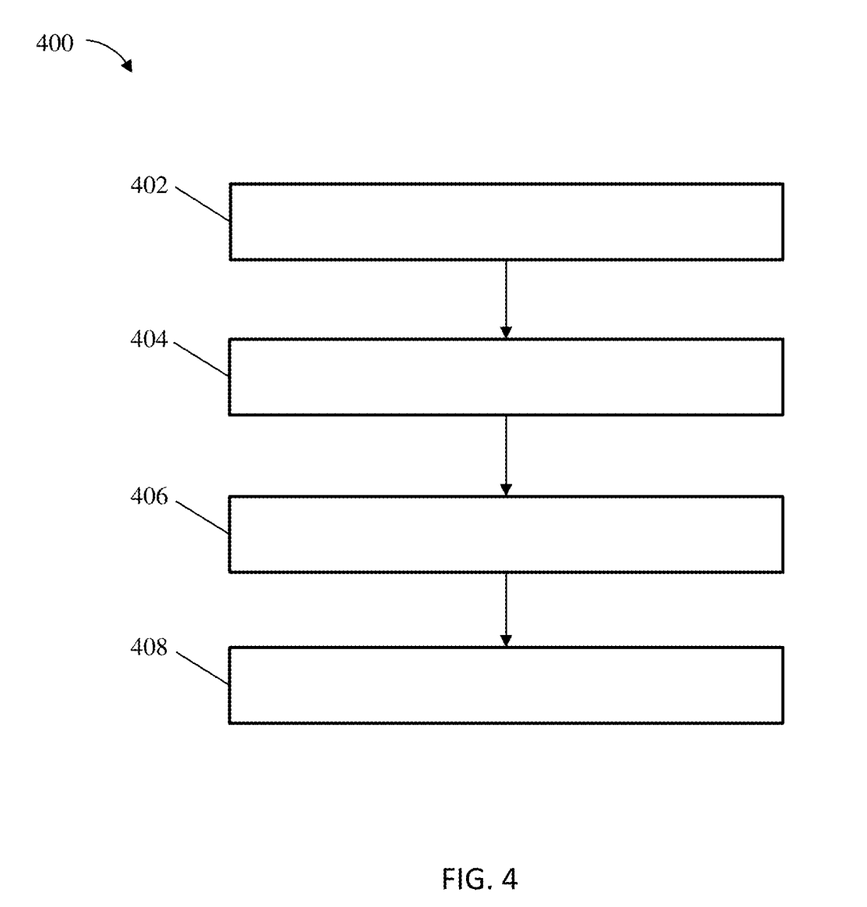
FIG. 4 is a flowchart in accordance with one or more embodiments.

Referring now to FIG. 4, a flowchart 400 for leveraging an X-ray fluorescence (XRF) mapping of copper current collectors for non-contact in-line quality inspection of thin lithium metal anodes is generally shown according to an embodiment. The flowchart 400 is described in reference to FIGS. 1-3 and may include additional steps not depicted in FIG. 4. Although depicted in a particular order, the blocks depicted in FIG. 4 can be rearranged, subdivided, and/or combined.

At block 402, an electrode is received at a detection surface of an XRF detector. In some embodiments of the invention, the electrode includes the lithium anode positioned (adhered) to a surface of a current collector. In some embodiments of the invention, the lithium anode is a thin lithium anode having a thickness of less than 20 microns. In some embodiments of the invention, continuous or near-continuous lithium anode characterization occurs by continuously moving the lithium metal anode across the detection surface of the XRF detector.

At block 404, X-rays are passed through the lithium anode and into the current collector. At block 406, an intensity of characteristic radiation from the current collector is measured at the XRF detector. In some embodiments of the invention, the current collector is a copper current collector and the characteristic radiation is fluorescing L shell characteristic radiation.

At block 408, a lithium anode characteristic is determined based on the measured intensity of characteristic radiation from the current collector. In some embodiments of the invention, the lithium anode characteristic includes one or more of lithium thickness, lithium thickness variation, the presence of a surface defect, and the presence of an internal defect. In some embodiments of the invention, characterizing the lithium anode occurs as a non-contact, non-destructive, in-line process.

In some embodiments of the invention, determining a lithium anode characteristic includes correlating the measured intensity of characteristic radiation to a thickness of lithium according to the formula $t=\ln(I_0/I)*\sin(\beta)*(\mu/\rho)^{-1}$, where $t$ is the thickness of lithium, $I_0$ is a baseline intensity with no lithium coating, $I$ is the measured intensity, $\beta$ is a detector angle, and $(\mu/\rho)$ is the mass absorption coefficient for lithium.

In some embodiments of the invention, a second intensity of second characteristic radiation is measured. The second intensity can be measured using the XRF detector or another XRF detector. In some embodiments of the invention, a chemical impurity is characterized based on the measured second intensity of second characteristic radiation from the current collector. In some embodiments of the invention, impurities can be found in the lithium coating and thus impurities characteristic radiation does not necessarily originate from the current collector.

In some embodiments of the invention, a second XRF detector can be positioned on an opposite surface of the lithium anode from the XRF detector for dual-sided anode characterization. In some embodiments of the invention, a plurality of second XRF detectors can be positioned on a same side of the lithium anode for edge-to-edge variability characterization.

Figure 5:
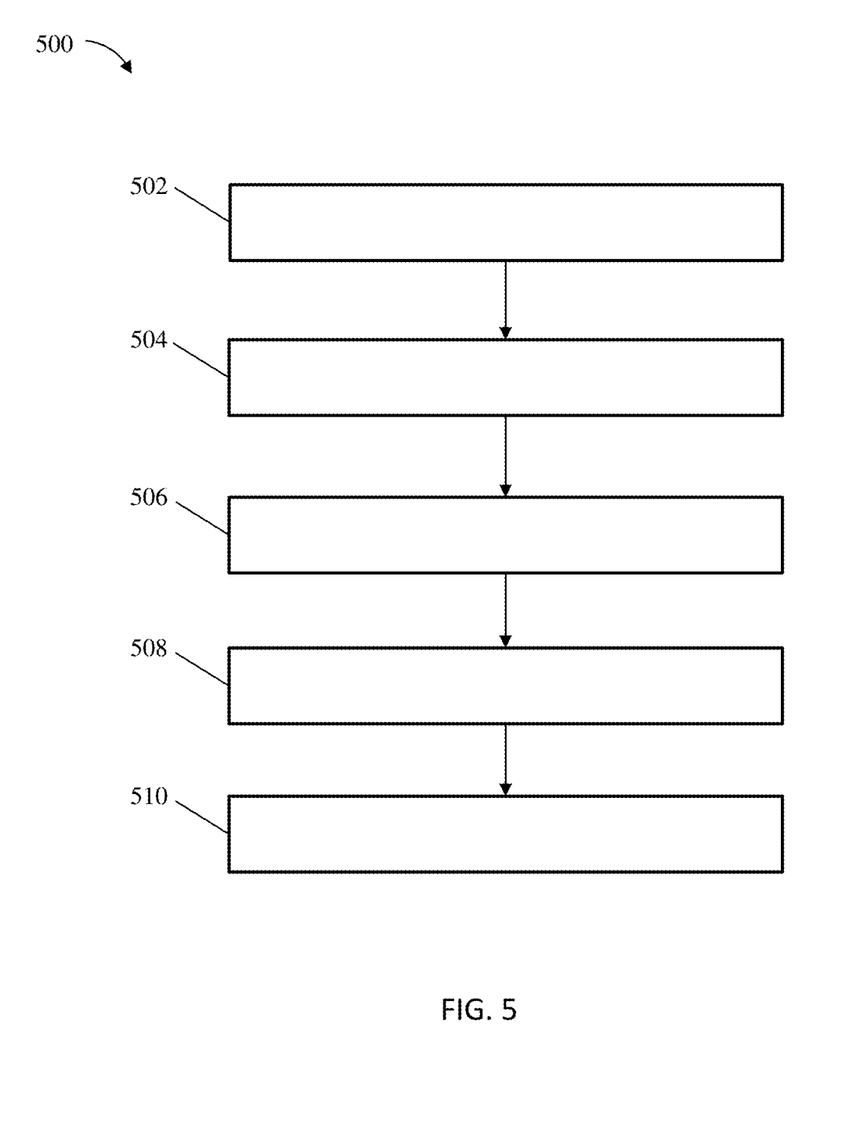
FIG. 5 is a flowchart in accordance with one or more embodiments.

Referring now to FIG. 5, a flowchart 500 for characterizing lithium anode defects is generally shown according to an embodiment. The flowchart 500 is described in reference to FIGS. 1-3 and may include additional steps not depicted in FIG. 5. Although depicted in a particular order, the blocks depicted in FIG. 5 can be rearranged, subdivided, and/or combined.

At block 502, a known defect is created in a reference lithium anode. In some embodiments of the invention, the known defect includes one of an internal void, a surface dent, and a surface bump in the reference lithium anode.

At block 504, a calibration electrode including the reference lithium anode is received at a detection surface of an XRF detector.

At block 506, X-rays are passed through the reference lithium anode and into the current collector. At block 508, a local intensity of characteristic radiation from the current collector is measured at a region corresponding to the known defect.

At block 510, a correlation between the measured local intensity and one or more parameters of the known defect is determined. The parameters can include, for example, a shape, depth, location, or size of the known defect.

In some embodiments of the invention, a second known defect is formed in the lithium anode having different characteristics (e.g., depth, shape, size, etc.) than the (first) known defect. A second local intensity of characteristic radiation from the current collector at a second region corresponding to the second known defect can be similarly measured and used to determine a correlation between the measured second local intensity and one or more parameters of the second known defect.

In some embodiments of the invention, an active electrode (i.e., one having unknown defects) is received at the detection surface of the XRF detector. X-rays through the lithium anode and into the current collector of the active electrode and an intensity of characteristic radiation from the current collector of the active electrode is measured. One or more previously unknown defects in the lithium anode of the active electrode based can be characterized based on the measured intensity of characteristic radiation from the current collector in the active electrode and the determined correlation between the measured local intensity and one or more parameters of the known defect in the calibration electrode.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for indirectly characterizing a lithium anode, the method comprising:
receiving an electrode at a detection surface of an X-ray fluorescence (XRF) detector, the electrode comprising the lithium anode on a surface of a current collector, the current collector comprising a copper current collector, the lithium anode comprising a thin lithium anode having a thickness of less than 20 microns;
passing X-rays through the lithium anode and into the current collector;
measuring, at the XRF detector, an intensity of characteristic radiation from the current collector, the characteristic radiation comprising fluorescing L shell characteristic radiation;

generating a current collector mapping from the measured intensity of characteristic radiation; and determining, from the current collector mapping, a lithium anode characteristic based on the measured intensity of characteristic radiation from the current collector.

2. The method of claim 1, wherein the lithium anode characteristic comprises one or more of lithium thickness, lithium thickness variation, a presence of a surface defect, and a presence of an internal defect.

3. The method of claim 1, wherein determining a lithium anode characteristic comprises correlating the measured intensity of characteristic radiation to a thickness of lithium according to the formula $t=\ln(I_0/I)*\sin(\beta)*(\mu/\rho)^{-1}$, where t is the thickness of lithium, $I_0$ is a baseline intensity with no lithium coating, I is the measured intensity of characteristic radiation, $\beta$ is a detector angle, and $(\mu/\rho)$ is a mass absorption coefficient for lithium.

4. The method of claim 1 further comprising measuring, at the XRF detector, a second intensity of a second characteristic radiation.

5. The method of claim 4 further comprising characterizing a presence of a chemical impurity based on the measured second intensity of second characteristic radiation.

6. The method of claim 1, wherein characterizing the lithium anode comprises a non-contact, non-destructive, in-line process.

7. The method of claim 6, wherein continuous or near-continuous lithium anode characterization occurs by moving the lithium anode across the detection surface of the XRF detector.

8. The method of claim 1 further comprising positioning a second XRF detector on an opposite surface of the lithium anode from the XRF detector.

9. The method of claim 1 further comprising positioning a plurality of second XRF detectors on a same side of the lithium anode for edge-to-edge variability characterization.

10. A method for indirectly characterizing lithium anode defects, the method comprising:

creating a known defect in a reference lithium anode, wherein the known defect comprises one of an internal void, a surface dent, and a surface bump in the reference lithium anode;

receiving a reference electrode at a detection surface of an X-ray fluorescence (XRF) detector, the reference electrode comprising the reference lithium anode on a surface of a current collector, the current collector comprising a copper current collector, the reference lithium anode comprising a thin lithium anode having a thickness of less than 20 microns;

passing X-rays through the reference lithium anode and into the current collector;

measuring, at the XRF detector, a local intensity of characteristic radiation from the current collector at a region corresponding to the known defect, the characteristic radiation comprising fluorescing L shell characteristic radiation;

generating a current collector mapping from the measured intensity of characteristic radiation; and determining, from the current collector mapping, a correlation between the measured local intensity of characteristic radiation and one or more parameters of the known defect.

11. The method of claim 10, wherein the one or more parameters of the known defect include a shape, a depth, a location, or a size of the known defect.

12. The method of claim 10 further comprising creating a second known defect in the lithium anode, wherein the second known defect is of a different type than the known defect.

13. The method of claim 12 further comprising measuring, at the XRF detector, a second local intensity of characteristic radiation from the current collector at a second region corresponding to the second known defect.

14. The method of claim 12 further comprising determining a correlation between the measured second local intensity of characteristic radiation and one or more parameters of the second known defect.

15. The method of claim 10, further comprising receiving an active electrode at the detection surface of the XRF detector, the active electrode comprising a lithium anode on a surface of a current collector.

16. The method of claim 15, further comprising passing X-rays through the lithium anode and into the current collector of the active electrode.

17. The method of claim 16, further comprising measuring, at the XRF detector, an intensity of characteristic radiation from the current collector of the active electrode.

18. The method of claim 17, further comprising characterizing a defect in the lithium anode of the active electrode based on the measured intensity of characteristic radiation from the current collector in the active electrode and the determined correlation between the measured local intensity of characteristic radiation and one or more parameters of the known defect in the reference electrode.

* * * * *